United States Patent [19]
Disselbeck et al.

[11] Patent Number: 5,364,686
[45] Date of Patent: Nov. 15, 1994

[54] MANUFACTURE OF A THREE-DIMENSIONALLY SHAPED TEXTILE MATERIAL AND USE THEREOF

[75] Inventors: Dieter Disselbeck, Bad Soden am Taunus; Elke Gebauer, Bobingen, both of Germany

[73] Assignee: Hoechst Aktiengesellschaft, Germany

[21] Appl. No.: 876,862

[22] Filed: Apr. 30, 1992

[30] Foreign Application Priority Data
May 4, 1991 [DE] Germany ............................. 4114571

[51] Int. Cl.⁵ .......................... B32B 1/00; B32B 7/00; B29C 67/00
[52] U.S. Cl. .................................... 428/174; 428/166; 428/175; 428/178; 428/212; 428/246; 428/251; 428/252; 428/253; 428/284; 428/285; 428/286; 428/287; 264/136; 264/137; 264/257; 264/258; 156/181; 156/196
[58] Field of Search ............... 428/178, 174, 175, 246, 428/212, 166, 251, 252, 253, 254, 284, 285, 286, 287, 319; 264/136, 137, 544, 261, 257, 258; 156/176, 181, 196, 228, 276

[56] References Cited

U.S. PATENT DOCUMENTS

| | | | |
|---|---|---|---|
| 3,219,514 | 11/1965 | De Roysancour | 428/178 |
| 4,118,261 | 10/1978 | Pedler | 428/178 |
| 4,631,221 | 12/1986 | Disselbeck et al. | 428/166 |
| 5,077,116 | 12/1991 | Lefkowitz | 428/296 |
| 5,132,166 | 7/1992 | Adams et al. | 428/296 |

*Primary Examiner*—Donald J. Loney
*Attorney, Agent, or Firm*—Connolly & Hutz

[57] ABSTRACT

There is described a process for manufacturing a dimensionally stable, three-dimensionally shaped, sheetlike textile material by bringing one or more layers of a deep-drawable textile material made of yarns, preferably a knitted material, and containing reinforcing fibers and a thermoplastic matrix material in fiber form which melts at a lower temperature than the reinforcing fibers, into the shape desired for the core material by an area-enlarging shaping process, for example by deep-drawing, at a temperature at which the fibrous thermoplastic matrix material melts, then reducing the temperature to back down to below the melting point of the thermoplastic matrix material and keeping the shaped material in the mold until the thermoplastic matrix material has sufficiently hardened, and then demolding the resulting shaped textile material.

10 Claims, 2 Drawing Sheets

MANUFACTURE OF A THREE-DIMENSIONALLY SHAPED TEXTILE MATERIAL AND USE THEREOF

BACKGROUND OF THE INVENTION

The present invention concerns a process for manufacturing a dimensionally stable, three-dimensionally shaped, sheetlike textile material, the shaped structures obtained by the process, and to the use of the structures as core material in the manufacture of sheetlike sandwich structures.

Sheetlike sandwich structures comprising a core and two cover layers whose core comprises dimensionally stable, three-dimensionally shaped textile materials are already known, for example from FR-A-23 25 503 and EP-A-158 234. The sandwich material described in these references has a core comprising a three-dimensionally shaped, sheetlike textile material with a regular arrangement of a multiplicity of elevations of equal height and a flat top on a base surface. Appreciable differences exist between the core materials known from FR-A-23 25 503 and EP-A-158 234 concerning their structure. While the materials known from FR-A-23 25 503 have an essentially completely closed structure, where not only the textile base areas but also the walls of the elevations distributed over the base area form a solid, pore-free, fiber-permeated resin material, the core materials known from EP-A 158 234 form a network structure of resin-impregnated threads with open loops.

The closed-structure core material known from FR-A-2 325 503 is manufactured by pressing a resin-impregnated laid staple fiber fabric into the desired geometric shape in a compression mold. In this process, a relatively large amount of resin is used, based on the fiber weight, so that the result of the pressing operation is an essentially fiber-reinforced resin structure.

The core material thus obtained has a relatively high weight. It does not permit any gas exchange, and it shows little flexibility.

The network-structured (hereinafter also filigree-structured) core material known from EP-A-158 234 is produced by deep drawing a resin-impregnated, deep-drawable textile material such as a resin-impregnated knitted fabric. This core material known from EP-A-158 234 combines good mechanical stability with low density. It permits free gas exchange between the sides of the sheet and it possesses high flexibility.

As mentioned earlier, the core material known from EP-A-158 234 is manufactured by impregnating a sheetlike textile material with a thermosetting resin, drying the impregnated material to form a prepreg and then forming the prepreg into the desired shape for the core material by a deep-drawing process.

A serious disadvantage of this manufacturing process is that it is difficult to impregnate a deep-drawable sheetlike textile material uniformly with a resin without prestretching the material completely or partially. Such a possibly nonuniform distortion of the textile sheet material results in a lack of deep-drawability and, in the finished product, in partial or complete loss of fiber strength. Similarly, the handling of the still not precondensed, resin-impregnated, deep-drawable textile material can easily result in a partial prestretching of this material with the abovementioned disadvantages for the uniformity of the quality of the end product, unless special precautions are taken. A further disadvantage of this known core material is that it is not readily recyclable. The manufacturing and recycling problems to some extent prevent wider use of these otherwise perfectly favorable core materials. The present invention overcomes the disadvantage of this known core material and the manufacture thereof.

SUMMARY OF THE INVENTION

The present invention provides a process for manufacturing a dimensionally stable, three-dimensionally shaped, sheetlike textile material, which comprises stacking on top of one another one or more layers of a deep-drawable textile material made of yarns and containing reinforcing fibers and a thermoplastic matrix material in fiber form which melts at a lower temperature than the reinforcing fibers, bringing the stack into the shape desired for the core material by an area-enlarging shaping process, for example by deep-drawing, at a temperature at which the fibrous thermoplastic matrix material melts, then reducing the temperature to back down to below the melting point of the thermoplastic matrix material and keeping the shaped material in the mold until the thermoplastic matrix material has sufficiently hardened, and then demolding the resulting shaped textile material.

The expression "sufficiently hardened" is to be understood as meaning that the matrix material is capable in this state of stabilizing the shaped sheetlike structure in the desired shape after the deep-drawing mold has been opened.

The shaped textile material thus produced is made of a porous network comprising a fiber composite. The porous network, like a fishing net, consists of a multiplicity of crossingly interconnected fiber composite elements, which leave open spaces in between. The fiber composite is made of the reinforcing yarn embedded in the matrix material.

DETAILED DESCRIPTION OF THE INVENTION

Figure 1:
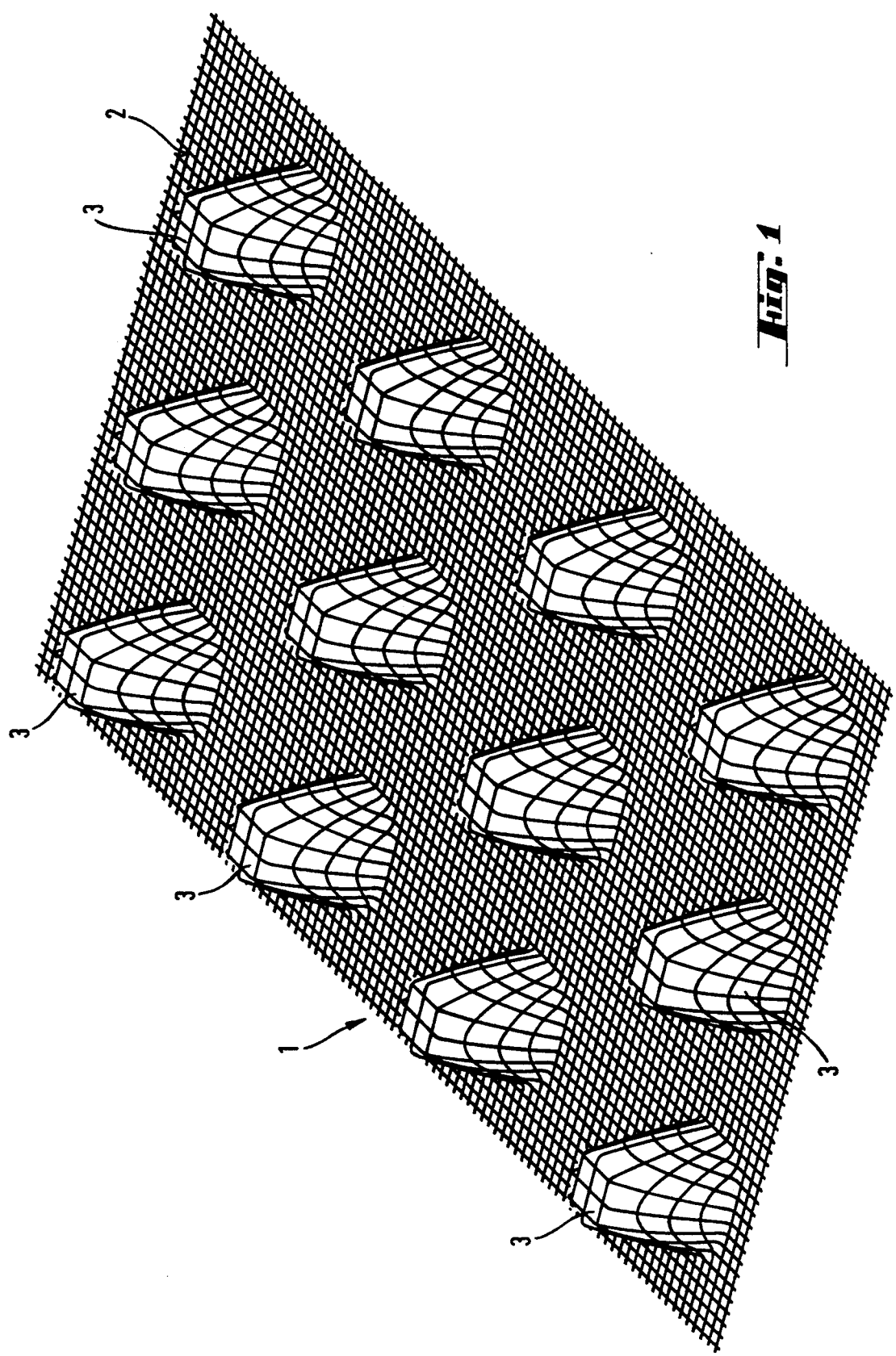
FIG. 1 is a diagrammatic representation of a dimensionally stable, three-dimensionally shaped, resinated sheetlike textile material (1) produced according to the present invention, where a base area (2) rises into a multiplicity of elevations (3). The Figure shows especially in the elevations a netty filigree structure obtained by stretching the base material.

Depending on the available equipment for manufacturing the core material according to the present invention, in particular on the accuracy of the temperature control means, the materials for reinforcing and matrix fibers are chosen in such a way that the melting point of the material of the reinforcing fibers is at least 10° C., preferably at least 30° C. above the melting point of the matrix material.

The weight ratio of reinforcing fibers to matrix fibers lies within the range from 20:80 to 80:20, preferably within the range from 40:60 to 60:40. In any particular case it is determined in such a way that, on forming the textile material, the spaces between the threads are opened up satisfactorily to give the desired porous network.

A further prescription for determining the weight ratio of reinforcing to matrix fibers results from the strength requirements of the three-dimensionally shaped textile material. In its use as core material for sandwich structures it must have a certain minimum compressive strength.

The deep-drawable textile sheet material can be a woven fabric made of extensible, for example crimped or low draw ratio, yarns. Preferably, however, the textile sheet material is a knitted material which, owing to its yarn arrangement, possesses a particularly high extensibility.

It has already been proposed to manufacture deep-drawable textile sheet materials from wrapped yarns comprising a filamentary core material which is wrapped with a sheath thread which is from 1.5 to 3 times, preferably from 1.8 to 2.2 times, longer than the core material. Sheetlike textile material formed from such wrapped yarn can be present in the form of a woven or knitted fabric. In the deep drawing of such a material the core threads in the regions to be deformed are broken at randomly dispersed points and release a corresponding length of the sheath thread. This mechanism makes it possible for an appreciable enlargement in area to take place in the course of the deep-drawing process without destruction of the fabric as a whole. Particular preference is given here to the use of a wrapped yarn whose core threads have a lower stability than the sheath filaments; that is, that the core thread is destroyed by the deep-drawing mechanical and possibly also thermal stress and/or by the action of chemicals, while the sheath thread is extended and takes over the load-bearing function in the sheetlike structure.

Suitable deep-drawable textile materials also include those which possess high, non-elastic formability, as known for example from GB-A-2 176 511 and also Derwent Abstracts 87-025859/04 and 87-040235/06 of Japanese Patent Publications 61-282452 and 61-296152. These known three-dimensionally formable textile materials are produced by subjecting corresponding sheetlike textile materials of synthetic fibers to a heat shrinkage treatment to confer non-elastic extensibility on them or by producing these textile materials from the start from yarns which naturally confer non-elastic extensibility. Non-elastically extensible yarns are described for example in DE-A-28 21 243 and DE-C-35 21 469.

The yarns contained in the deep-drawable textile material can contain staple fibers or textured or non-textured continuous filament fibers as reinforcing fibers.

Staple fiber yarns are produced by secondary spinning from relatively short filament sections as present in natural fibers or in synthetic staple fibers. Continuous filament fiber yarns consist of continuous man-made synthetic-polymer (for example polyester) or natural-polymer (for example regenerated cellulose) filaments. The yarns can have been textured; that is, they may have a more or less pronounced crimp and they may be twisted or twistless.

The reinforcing fibers can consist of an inorganic material, for example glass fibers, mineral fibers, ceramic fibers or carbon fibers, or of an organic, spinnable material.

Reinforcing fibers made of an organic material can consist of natural fibers, for example cellulose fibers such as cotton, jute, flax or hemp fibers, or protein fibers, for example wool or silk. However, the preferred organic fibers are synthetic-polymer or natural-polymer man-made fibers, since the properties thereof are very readily adaptable to the intended use in a conventional manner.

Preferred materials for the reinforcing fibers are therefore in addition to the inorganic materials glass or carbon synthetic polymers such as polyolefins, in particular polyethylene and polypropylene, partly or wholly aromatic polyesters, aliphatic or aromatic polyamides, polyether ketones, polyether ether ketones, polyether sulfones, polysulfones, polyacrylonitrile, polyphenylene sulfide or polyether imides.

An overview with numerous further references is given in *Ullmann3 s Encyclopedia of Industrial Chemistry*, 5th edition, volume A13, page 1 ff. (High-Performance Fibres).

For cost-benefit reasons the reinforcing fibers which are particularly preferred at present are made of polyacrylonitrile or of polyesters, in particular based on terephthalic acid and ethylene glycol. These polyesters may contain in addition to the basic building blocks mentioned further dicarboxylic acid and/or diol building blocks which modify their properties, for example radicals of isophthalic acid, aliphatic dicarboxylic acids having on average 6–10 carbon atoms, of sulfoisophthalic acid, radicals of long-chain diols having on average from 3 to 8 carbon atoms, ether diols, for example diglycol or triglycol radicals, or else small amounts of polyglycol radicals. These modifying components are in general present in the polyester as cocondensed units in not more than 15 mol %. Particular preference is given to reinforcing yarns made of polyethylene terephthalate containing less than 5 mol % of modifying components, in particular made of pure unmodified polyethylene terephthalate or polybutylene terephthalate.

Of particular suitability here are of course the high-strength industrial polyacrylonitrile and polyethylene terephthalate fibers such as the (R)DOLANIT or (R)TREVIRA HOCHFEST products available from Hoechst AG.

The deep-drawable textile sheet material contains, as mentioned earlier, the fibrous matrix material in the likewise abovementioned amounts. This matrix material, like the reinforcing fibers, may be in the form of staple or continuous filament fibers. The matrix fibers can have been incorporated into the deep-drawable textile material in various ways.

The textile sheet material can be produced from a commingled yarn composed of matrix and reinforcing fibers, or yarns composed of thermoplastic fibers and yarns composed of non-melting or high-melting reinforcing fibers can be cowoven or coknitted in a conventional manner to produce the sheet material. A further way of producing a textile sheet material which contains a thermoplastic matrix material in fiber form (herein the term "fibers" also encompasses continuous filament fibers as well as staple fibers) comprises using a yarn which consists as a whole or in part of bicomponent fibers composed of a high-melting and a low-melting polymer material. In these bicomponent fibers, the polymer components may be present in a side-by-side arrangement or in a concentric core-sheath arrangement.

Thermoplastic matrix materials for the purposes of this invention are all macromolecular spinnable substances, in particular organic addition or condensation polymers which are meltable without decomposing and whose mechanical stability is sufficient to confer dimensional stability on them.

Depending on the melting point of the reinforcing yarn used and on the intended purpose, a thermoplastic having a suitable melting or softening point is selected from the multitude of available thermoplastics. The organic polymer of the thermoplastic matrix advantageously has a melting point of from 100 to 350° C. Suitable basic materials for a thermoplastic matrix are polymers such as substituted or unsubstituted polyalkylene, for example polyethylene, polypropylene or polyvinyl chloride, preferably in their high-strength embodiments. Particularly suitable matrix resins, on account of the varied modifiability of their composition and properties, are condensation polymers, in particular partly or wholly aromatic polyesters, aliphatic or aromatic polyamides, polyether ketones, polyether ether ketones, polyether sulfones, polysulfones, polyphenylene sulfide or polyether imide.

The preparation, processing and properties of these thermoplastic matrix resins is known to the person skilled in the art. They are described in the relevant literature and are commercially available in many grades covering a wide range of specifications. An overview with numerous further references is given in *Ullmann's Encyclopedia of Industrial Chemistry*, 5th edition, volume A7, page 369 ff. (Composite Materials) and also volume A13, page 1 ff. (High-Performance Fibres).

Some examples of suitable combinations for the fiber composite contained in the core material according to the present invention are (in the order fiber/matrix): polyethylene terephthalate/polybutylene terephthalate, glass/polyethylene or polypropylene, glass/polyether imide, carbon fiber/polyether ketone, aromatic polyamide (aramid)/polyethylene terephthalate, polyacrylonitrile/polyethylene terephthalate.

Particularly preferred textile materials are preferably knitted from a commingled yarn composed of high-tenacity polyacrylonitrile or polyester fibers and matrix fibers composed of a modified polyester or of polybutylene terephthalate.

The proportion of matrix fibers in the textile material to be shaped according to the present invention is determined in such a way that, on extension, the textile material should form a filigreelike network.

As mentioned earlier, this requirement is generally satisfied when the ratio of the weights of reinforcing fibers and matrix fibers lies within the range of from 20:80 to 80:20, preferably within the range from 40:60 to 60:40.

However, if special techniques are employed in the manufacture of sandwich structures it can also be perfectly sufficient for less resin to be used, based on the textile material, so that the matrix does not enclose the entire fiber material, but ensures the dimensional stability of the shaped textile material. Such, low-matrix articles can be made into high-strength sandwich structures by adhering to cover layers, provided the articles are adhered using a liquid or pasty adhesive and previously wetted with liquid which also acts as solvent and/or wetting agent for the adhesive. It is to be noted here that the adhesive will rise within the grid structure of the network-structured article and additionally strengthen it when hard. Without wetting the adhesive does not rise along the walls. The use of specific hydrophilic hardeners known to the person skilled in the art will likewise produce in this manner an increase in the compressive and shear strength of the sandwich structures.

For special purposes it is also possible to use stacks of a plurality of plies of deep-drawable textile material or of plies of different textile materials. For instance, it is possible for batts to be placed between at least two plies of the above-described deep-drawable textile materials. It is also possible to vary the reinforcing fiber material of the textile sheet materials, for example by combining lengths of textile materials made of organic and inorganic fibers, for example glass fibers. The stack is heated in a deep-drawing mold to a temperature at which the matrix material becomes flowable, then drawn into the desired three-dimensional shape and kept in this shape at a temperature at which the matrix material can harden until the hardening process is complete or at least sufficiently advanced for the deep-drawn material to remain dimensionally stable.

In the flowable phase the liquefied matrix material envelops the reinforcing fibers of the textile sheet material.

Particularly preferred embodiments of the process according to the present invention are those in which a plurality of the abovementioned preferred features are realized.

Figure 2:
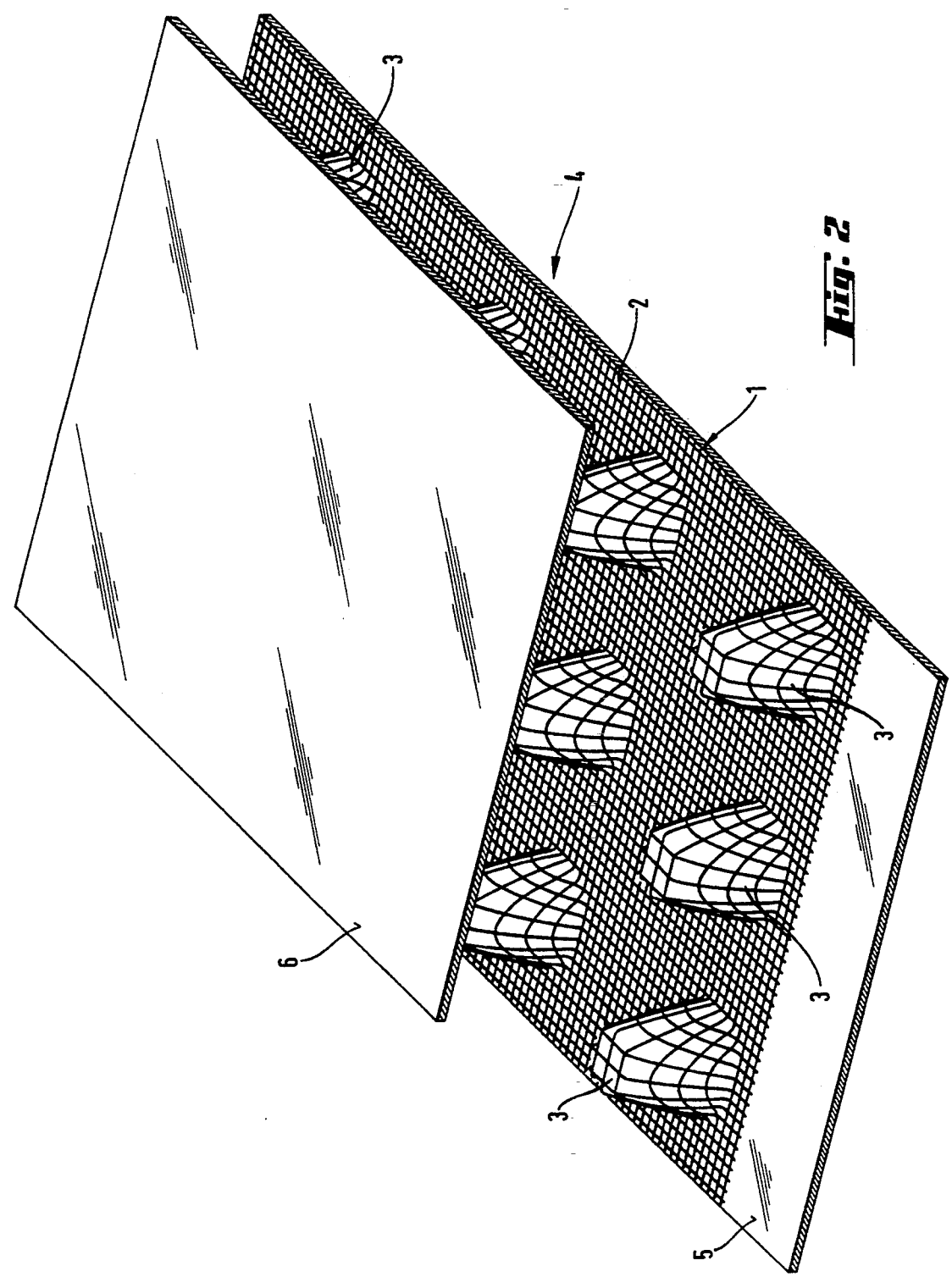
FIG. 2 illustrates a sandwich structure including the sheetlike textile material.

The three-dimensionally shaped textile material manufactured according to the present invention can be used in a conventional manner, for example as described in detail in European Patent No. 158 234, for manufacturing sandwich structures. For this it is possible to use one or more layers of the three-dimensionally shaped material as core for the sandwich structure, arranging the core layers either superposingly or—as described in the cited reference—intermeshingly. To manufacture the sandwich structure, the core material is provided on both sides in a conventional manner with relatively thin firm cover layers. The cover layers are customarily attached to the core material by means of suitable known adhesives, in particular by means of crosslinking polymer adhesives. FIG. 2 illustrates an embodiment of such a sandwich structure (4). It shows such a material in an oblique plan view with a lower cover layer (5), a partly removed upper cover layer (6) and the dimensionally stable three-dimensionally shaped textile material (1) manufactured according to the present invention and adhered as core between the cover layers.

As cover layers for the manufacturable sandwich structures it is possible to use any of the outside sheets already previously used for sandwich constructions, for example aluminum or steel sheets, but in particular synthetic resin laminates with inlays, for example of woven fabrics, of carbon or glass threads. In simpler cases, however, it is also possible to use as cover layers for example plywood or hard fiber board. In the manufacturing process, the core material produced according to the present invention is arranged between two cover layers provided on their inner surfaces with the adhesive material, and the resulting sandwich is bonded together under light pressure, if necessary at elevated temperature.

The following embodiment example serves to illustrate the process according to the present invention:

EXAMPLE

One thread each of a 340 dtex multifilament R glass yarn and of a 380 dtex 48 filament polyether imide yarn are air entangled to form a 720 dtex hybrid yarn. This hybrid yarn, which has a volume content of about 30% glass and about 70% polyether imide, is used to produce a piece of tight but extensible knitwear having a basis weight of 200 g/m².

This textile sheet material is introduced into a deep-drawing tool set preheated to 320° C. The drawplate of the tool set has a square pattern of round holes 1.5 cm in diameter with a midpoint spacing of 2.2 cm and a draw punch with a square arrangement of 2 cm high round punches 1 cm in diameter with a midpoint spacing of 2.2 cm, the punches being centered in respect of the holes.

The mold is closed at a working temperature of 320° C. and maintained at that temperature for 3 minutes.

The closed deep-drawing mold is then cooled down to room temperature and the resulting three-dimensionally shaped material is removed.

The deep-drawn textile material thus produced has on a base area a regular arrangement of a multiplicity of thimblelike elevations about 2 cm in height with a flat top surface and a spacing of 2.2 cm and exhibits throughout an open filigree structure. It is highly suitable for use as core material for manufacturing sheetlike sandwich structures. A sandwich plate manufactured using this shaped textile material as core and two 1.5 mm thick plywood sheets as cover layers has a compressive strength of 0.4 N/mm².

What is claimed is:

1. A process for manufacturing a dimensionally stable, three-dimensionally shaped, textile material, which comprises stacking on top of one another one or more layers of a deep-drawable textile material made of yarns and containing reinforcing fibers and a thermoplastic matrix material in fiber form which melts at a lower temperature than the reinforcing fibers, bringing the stack into the shape desired for the core material by an area-enlarging shaping process, at a temperature at which the fibrous thermoplastic matrix material melts, then reducing the temperature to back down to below the melting point of the thermoplastic matrix material and keeping the shaped material in the mold until the thermoplastic matrix material has sufficiently hardened, and then demolding the resulting shaped textile material.

2. The process of claim 1, wherein the deep-drawable textile material possesses a high elastic extensibility.

3. The process of claim 1, wherein the deep-drawable textile material is a knitted material.

4. The process of claim 1, wherein the deep-drawable textile material has been produced from a commingled yarn composed of matrix and reinforcing fibers.

5. The process of claim 1, wherein the deep-drawable textile material comprises bicomponent fibers composed of a high-melting and a low-melting polymer material, the polymer components being in a side-by-side arrangement or in a concentric core-sheath arrangement.

6. The process of claim 1, wherein the deep-drawable textile material comprises yarns composed of thermoplastic fibers and yarns composed of non-melting or high-melting reinforcing fibers which have been cowoven or coknitted.

7. The process of claim 1, wherein the melting point difference between the reinforcing fibers and the matrix fibers is at least 10° C.

8. The process of claim 1, wherein the reinforcing fibers and the matrix fibers comprise polyesters having different melting points.

9. The dimensionally stable, three-dimensionally shaped, textile material manufactured by the process of claim 1.

10. The process of claim 7, wherein the melting point difference between the reinforcing fibers and the matrix fibers is at least 30° C.

* * * * *